United States Patent [19]

Ikemoto

[11] Patent Number: 5,515,495
[45] Date of Patent: May 7, 1996

[54] ICON DISPLAY APPARATUS

[75] Inventor: Hiroyuki Ikemoto, Tokyo, Japan

[73] Assignee: Kabushiki Kaisha Toshiba, Japan

[21] Appl. No.: 953,028

[22] Filed: Sep. 29, 1992

[30] Foreign Application Priority Data

Sep. 30, 1991 [JP] Japan ................... 3-252492

[51] Int. Cl.$^6$ ................................. G06F 15/62
[52] U.S. Cl. ................................. 395/159
[58] Field of Search ................. 395/155–161

[56] References Cited

U.S. PATENT DOCUMENTS

| 5,140,678 | 8/1992 | Torres | 395/159 |
| 5,146,556 | 9/1992 | Hullot et al. | 395/155 |

OTHER PUBLICATIONS

IEEE Recommended Practice for Graphical User Interface Drivability, Balloting Draft 1, May 1992, pp. 53 and 134–135.
Tab Window Manager for the X Window System, Excerpt from manual, Sun Release 4.1, Last Change: 31 Jan. 1991.
Microsoft Windows User's Guide, Version 1.03, 1987, pp. 26, 46–49, 52.
Microsoft Windows User's Guide, Version 3.1, 1990, pp. 1–16, 45, 46. Microsoft Corporation.

*Primary Examiner*—Mark R. Powell
*Assistant Examiner*—Huynh Ba
*Attorney, Agent, or Firm*—Banner & Allegretti, Ltd.

[57] ABSTRACT

An icon display apparatus includes a display having a screen for displaying at least one window and a plurality of icons, an icon image memory for storing a plurality of icon data corresponding to the plurality of icons displayed on the display, a window image memory for storing a plurality of window picture data corresponding to the plurality of windows selectively displayed on the display, an iconifying circuit for converting a window displayed on a screen of the display into an icon, a mouse for designating a window to be iconified and a display position of the converted icon on the screen of the display, and a display drive circuit for supplying icon data corresponding to the window and coordinate data corresponding to the designated display position so as to display the converted icon at the designated position on the screen.

7 Claims, 7 Drawing Sheets

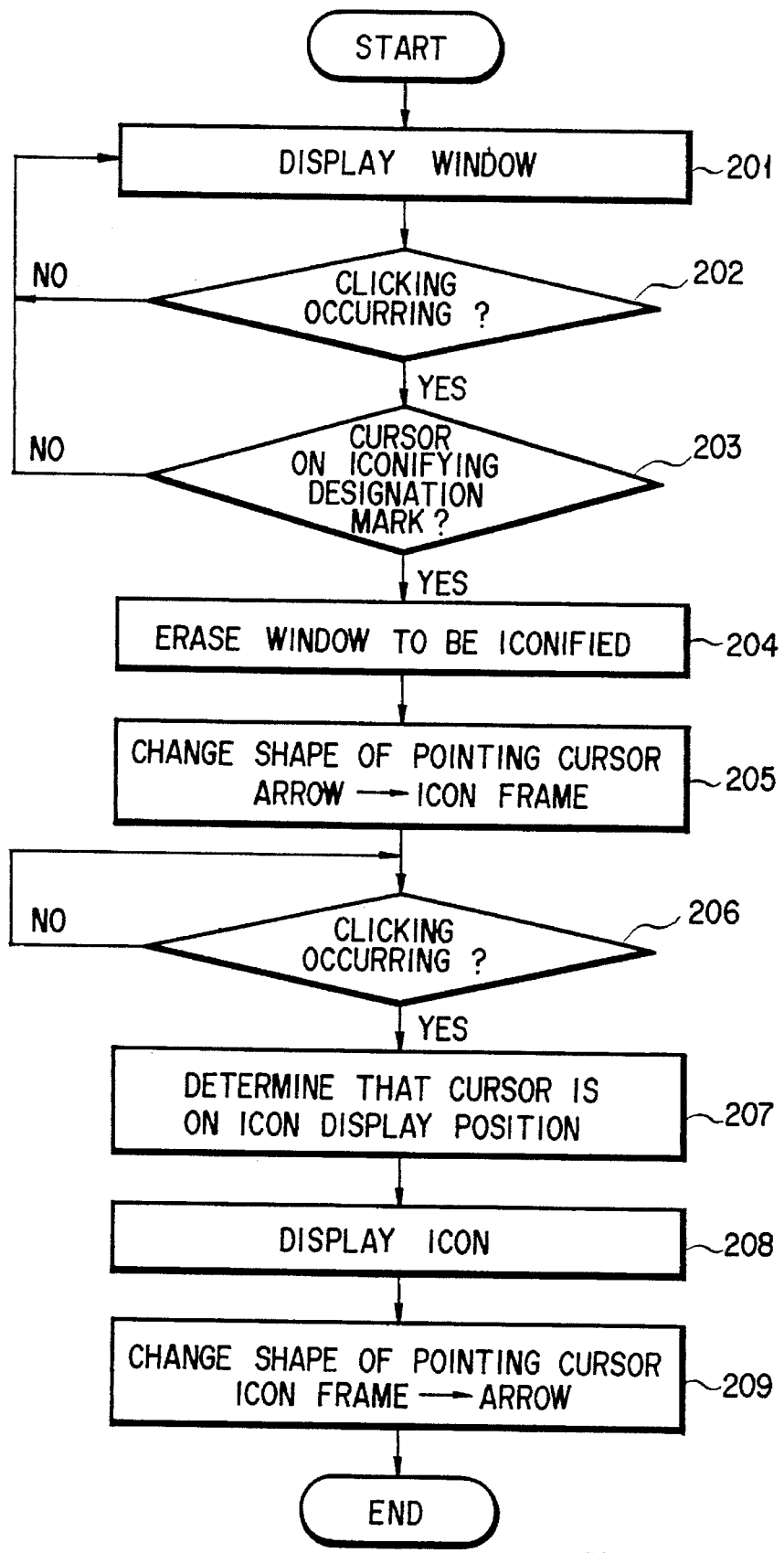
F I G. 2

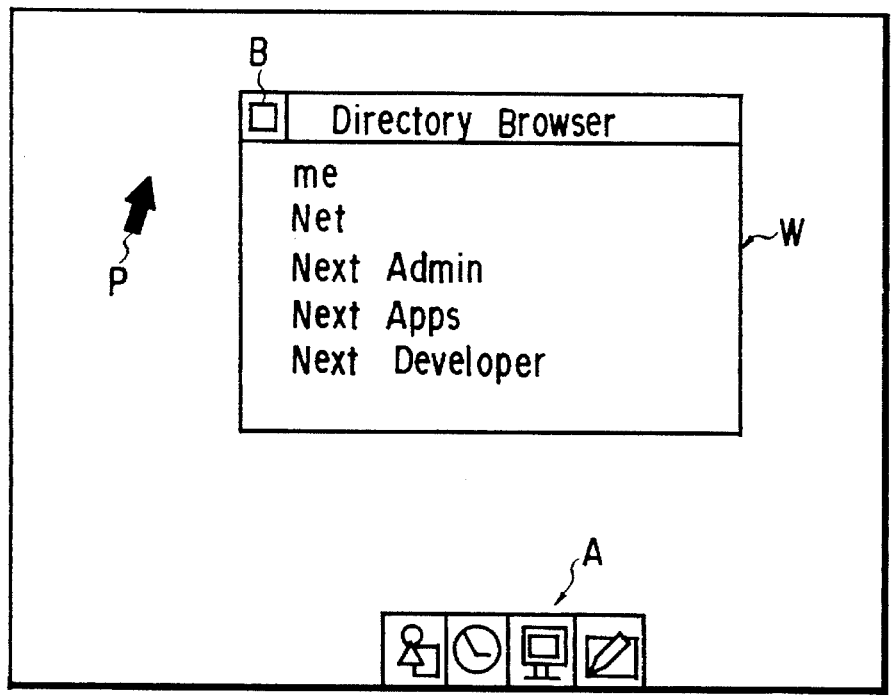
F I G. 3A
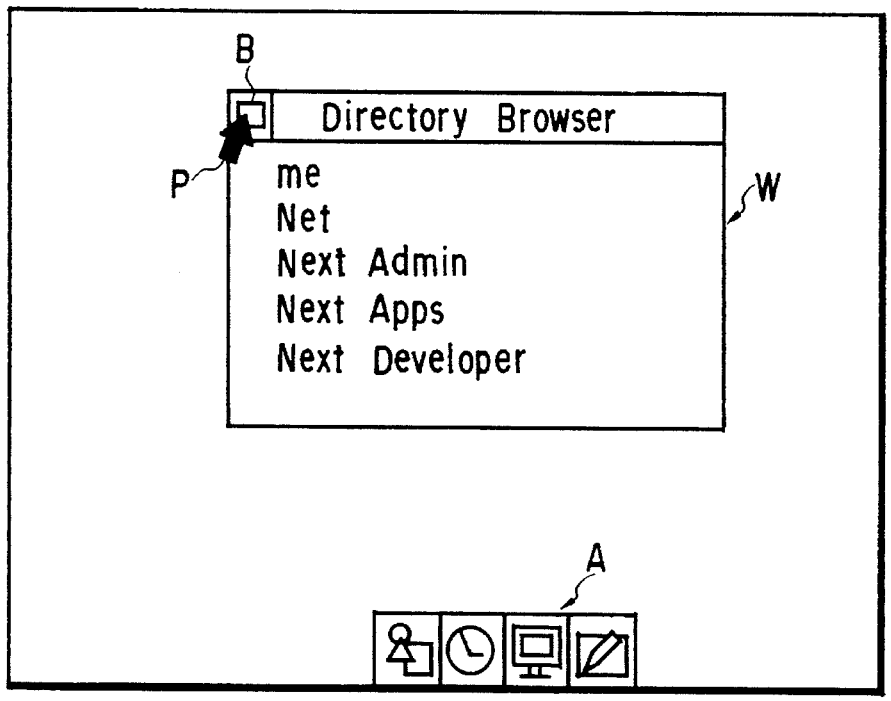
F I G. 3B

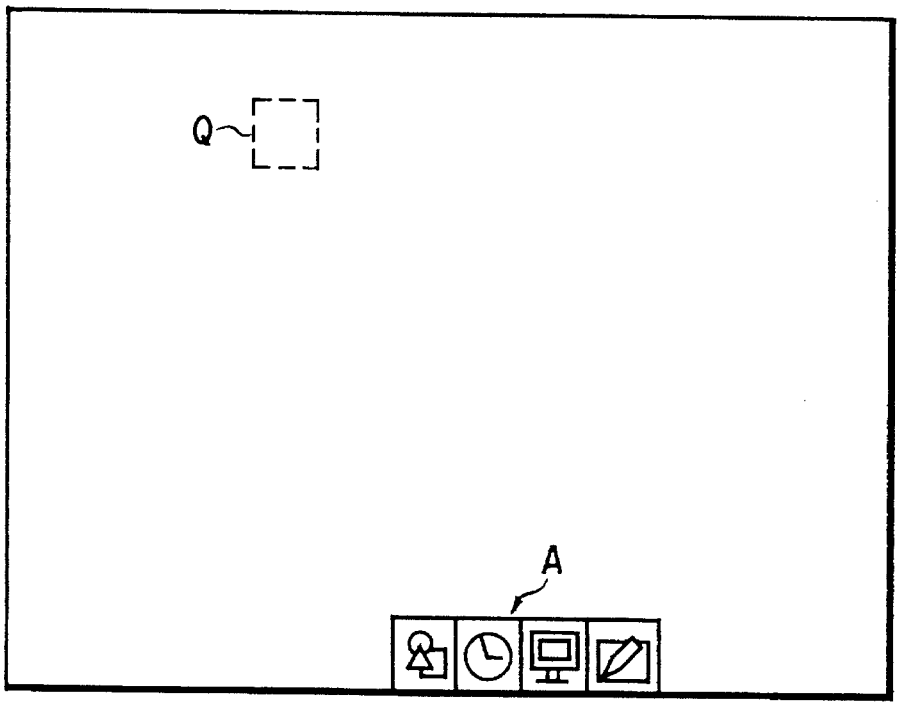
F I G. 3C
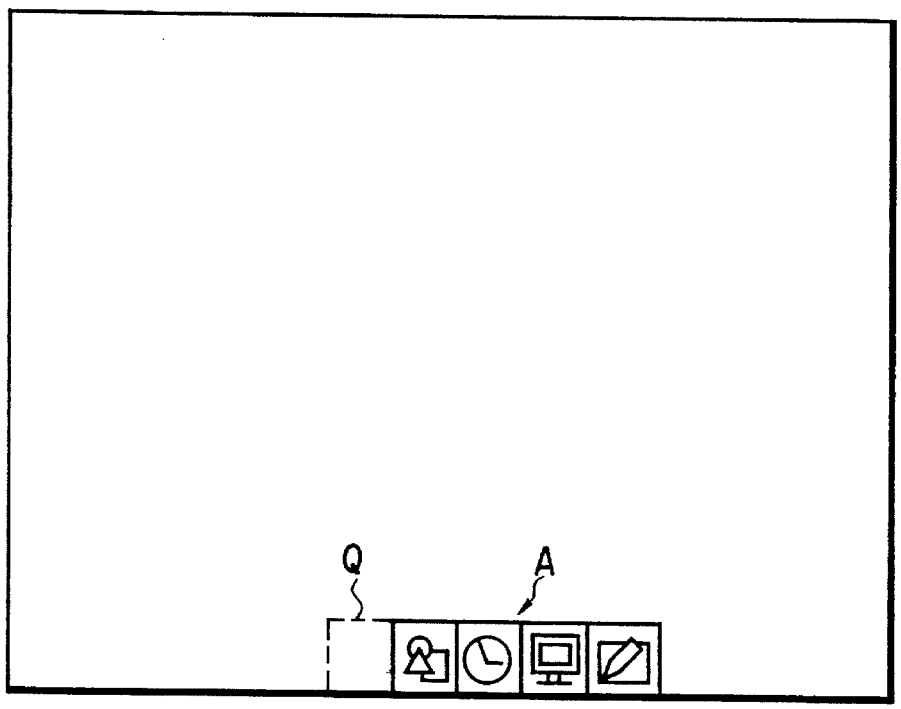
F I G. 3D

| WINDOW NAME | WINDOW DISPLAY COORDINATE | DISPLAY ORDER | ICON STATE | ICON DISPLAY COORDINATE |
|---|---|---|---|---|
| WINDOW 1 | (100,100)—(200,200) | 1 | NO | — |
| WINDOW 2 | (100,100)—(300,400) | 2 | NO | — |
| WINDOW 3 | (100,100)—(200,300) | — | YES | (100,100)—(200,300) |
| WINDOW 4 | | 3 | NO | — |
| WINDOW 5 | | 4 | NO | — |
| WINDOW 6 | | 5 | NO | — |
| ---- | ---- | ---- | ---- | ---- |
| WINDOW N | | N | NO | — |

F I G. 5

1

ICON DISPLAY APPARATUS

BACKGROUND OF THE INVENTION

1. Field of the Invention

The present invention relates to an icon display apparatus for displaying an icon for selecting a function. 2. Description of the Related Art A conventional apparatus allows a user to immediately understand each function when a desired one of various functions expressed with pictographs on a display screen is selected. In recent years, as is reported in the IEEE Recommendation Practice for Graphic User Interface Drivability, an icon display apparatus is proposed wherein a window is converted into an icon in accordance with a predetermined operation, and vice versa.

In a conventional icon display apparatus, when a window is converted into an icon, the icon is displayed at a position determined in accordance with a predetermined rule based on the attribute of the icon. The user cannot freely select an icon display position. In other words, the icon order cannot be changed in accordance with the operational preference of the user.

As a method of causing a user himself to set an icon display position, a method of setting an icon display position with numerical values as screen coordinates when a window is to be displayed, and a method of changing the display position of an already displayed icon may be proposed. According to these methods, however, the icon display position cannot be immediately understood, and selection efficiency of functions is degraded, resulting in inconvenience.

SUMMARY OF THE INVENTION

It is an object of the present invention to provide an icon display apparatus capable of displaying an icon at a position desired by a user with a simple input operation.

According to the present invention, there is provided an icon display apparatus comprising a display unit capable of displaying an icon, an input device for designating a display position of the icon on a screen of the display unit, and an icon display control circuit for controlling the display unit so that the icon is displayed at the position on the display screen which is designated by the input device.

According to the present invention, there is also provided an icon display apparatus comprising a display unit capable of displaying a window and an icon corresponding to the window, an input device for designating a window to be converted into the icon and a display position of the converted icon on a display screen, and an icon display control circuit for controlling conversion of the window designated by the input device into the icon and displaying the converted icon at the display position on the display screen which is designated by the input device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a flow chart for explaining the operation of the icon display apparatus shown in FIG. 1;

FIGS. 3A to 3E are views showing display screen states until an icon is displayed at a predetermined position on the display screen after a window is iconified;

FIG. 5 is a view showing the data format of a window display coordinate storage.

DETAILED DESCRIPTION OF THE PREFERRED EMBODIMENTS

Figure 1:
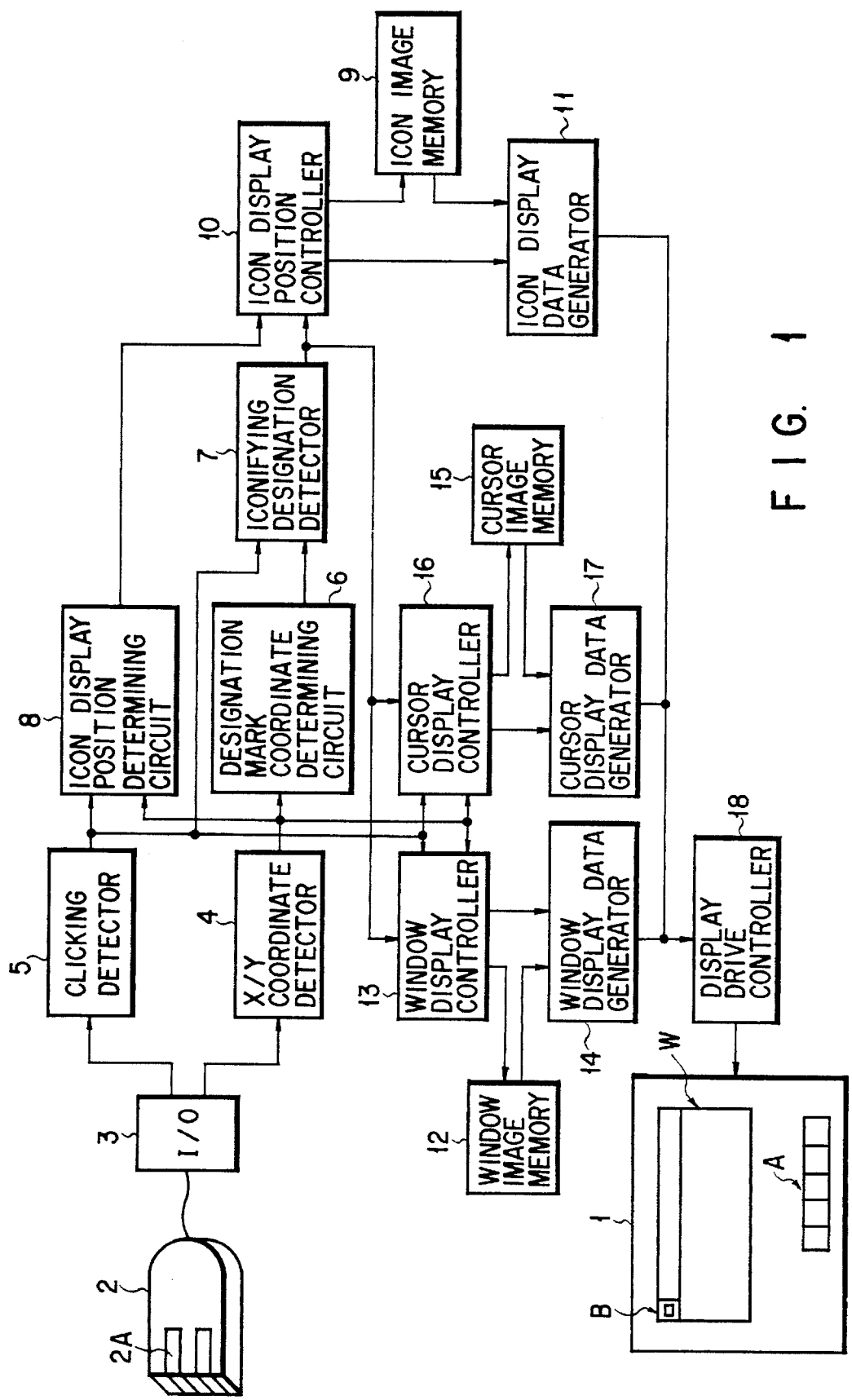
FIG. 1 is a block diagram of an icon display apparatus according to an embodiment of the present invention.

In an icon display apparatus shown in FIG. 1, a CRT display 1 can display a window W for displaying menus, various icons A, and a pointing cursor (not shown). An iconifying designation mark B is displayed at the upper left corner of the window W. When the pointing cursor is moved onto the iconifying designation mark B, and the designation mark is designated, the window W is iconified into a corresponding icon at an arbitrary position. Conversely, when an icon is designated, the designated icon is restored to a menu display window w corresponding to this icon.

A mouse 2 is used as an input device for moving the pointing cursor on the screen of the CRT display 1 to designate and input a menu, an icon A, and the iconifying designation mark B. A signal from the mouse 2 is input to an X/Y coordinate detector 4 and a clicking detector 5 through an I/O interface 3. An iconifying designation mark coordinate determining circuit 6 determines whether coordinates detected by the X/Y coordinate detector 4 are the coordinates of the iconifying designation mark B on the screen. An iconifying designation detector 7 detects designation of the iconifying designation mark B on the basis of inputs from the designation mark coordinate determining circuit 6 and the clicking detector 5. On the basis of the inputs from the X/Y coordinate detector 4 and the clicking detector 5 upon iconifying designation, an icon display position determining circuit 8 determines the position on which an icon is to be displayed. An icon image memory 9 permanently stores bit map data associated with icons respectively corresponding to the plurality of windows W. An icon display position controller 10 reads out, from the icon image memory 9, data associated with an icon corresponding to a window W designated for iconifying and provides control to display the icon at an icon display position determined by the icon display position determining circuit 8. An icon display data generator 11 generates icon display data under the control of the icon display position controller 10.

A window image memory 12 permanently stores data associated with a window picture. A window display controller 13 performs various control operations associated with the window display. A window display data generator 14 generates window display data using data read out from the window image memory 12 under the control of the window display controller 13. A cursor image memory 15 stores data associated with a pointing cursor pictograph, bit map data of, e.g., an arrow cursor P, and bit map data of icon frame cursor Q (see FIGS. 3A to 3E). A cursor display controller 16 performs various control operations for the cursor display. A cursor display data generator 17 generates cursor display data using the data read out from the cursor image memory 15 under the control of the cursor display controller 16. A display drive controller 18 drives the CRT display 1 on the basis of the display data generated by the icon display data generator 11, the window display data generator 14, and the cursor display data generator 17.

The operation of the icon display apparatus will be described with reference to a flow chart in FIG. 2 and to FIGS. 3A to 3E.

When the start is initiated, an initial picture shown in FIG. 3A, i.e., a picture prior to iconifying or a picture including the window W, the icon A, and the arrow pointing cursor P is displayed on the CRT display 1 (step 201). In this state, the user operates the mouse 2 to move the pointing cursor P onto the iconifying designation mark B within the window W, as shown in FIG. 3B, and depresses a click button 2A (step 202). The iconifying designation detector 7 detects this iconifying designation (step 203).

when the iconifying designation is detected, the window display controller 13 controls the window display data generator 14 to determine the type of window W to be iconified and erase the picture of this window W from the screen, as shown in FIG. 3C (step 204). Subsequently, the cursor display controller 16 controls the cursor display data generator 17 to change the arrow pointing cursor P to the icon frame pointing cursor Q (step 205).

In step 206, when the user operates the mouse 2 to move the pointing cursor Q to a desired position, as shown in FIG. 3D, and depresses the click button 2A (step 206), the icon display position determining circuit 8 determines this cursor position as a position 10 at which the icon is to be displayed (step 207). Information of this icon display position is supplied from the icon display position determining circuit 8 to the icon display position controller 10.

The icon display position controller 10 reads out, from the icon image memory 9, data associated with the icon corresponding to the window W designated for iconifying. The icon display position controller 10 supplies the readout data to the display data generator 11 and at the same time supplies information associated with this icon display position to the icon display data generator 11.

Figure 3E:
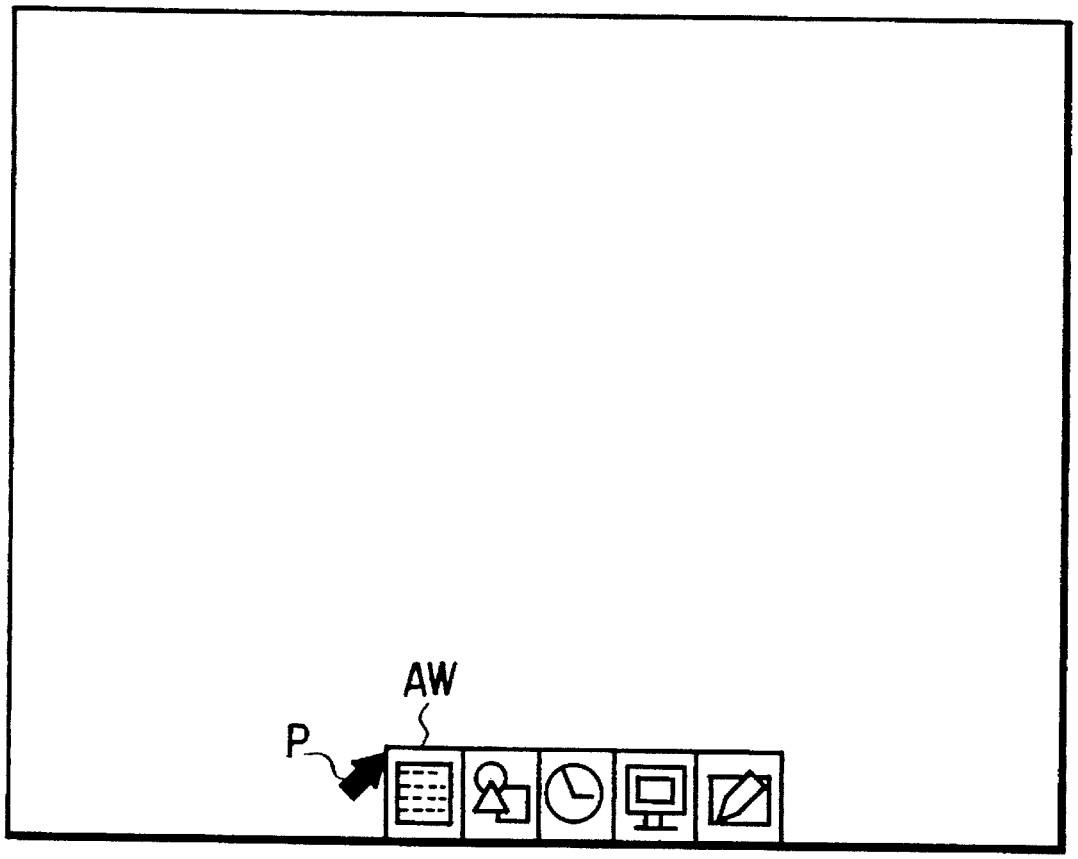

The icon display data generator 11 generates icon display data on the basis of these pieces of input information and outputs the icon display data to the CRT display 1 through the display drive controller 18. Therefore, an icon AW corresponding to the erased window W is displayed at the position desired by the user, as shown in FIG. 3E (step 208).

In step 209, the cursor display controller 16 controls the cursor display data generator 17 to restore the icon frame pointing cursor Q to the arrow pointing cursor P.

As described above, according to this embodiment, after the window W to be iconified is designated on the screen using the mouse 2, the position at which this icon is to be displayed can be set by a similar operation using the mouse 2. Therefore, the overall layout of icons can be freely set in a form desired by the user. An icon display system having better operability can be realized.

Another embodiment will be described with reference to FIG. 4.

In this embodiment, a mouse 2 is connected to a clicking detector 5 and an X/Y coordinate detector 4 through an I/O interface 3. The output terminals of the X/Y coordinate detector 4 and the clicking detector 5 are connected to the input terminals of an iconifying designation detector 7 and an icon display position determining circuit 8, respectively. The output terminals of the iconifying designation detector 7 and the icon display position determining circuit 8 are connected to the read terminal of an icon image memory 9 and the input terminal of an icon display position controller 10. The output terminal of the icon display position controller 10 is connected to the input terminal of an icon display data generator 11.

The output terminal of a window image memory 12 is connected to the input terminal of a window display controller 13. The output terminal of the window display controller 13 is connected to the input terminal of a window display data generator 14. The input terminal of a cursor display controller 16 is connected to the output terminals of the X/Y coordinate detector 4, 10 the iconifying designation detector 7, and a cursor image memory 15. The output terminal of the cursor display controller 16 is connected to the input terminal of a cursor display data generator 17. The output terminal of the cursor display data generator 17 and the output terminals of the icon display data generator 11 and the window display data generator 14 are connected to the input terminals of a display drive controller 18.

The circuit arrangement described above is substantially the same as that of the icon display apparatus shown in FIG. 1. However, in the embodiment shown in FIG. 4, a window display coordinate storage 26 is arranged in place of the designation mark coordinate determining circuit 6 in the embodiment shown in FIG. 1. The window display coordinate storage 26 stores the entire display area (coordinates) of a window currently displayed on the display screen, a display order (i.e., an overlap order of 1 to N windows from the operator side), an iconifying flag representing whether an iconifying state is set, and icon display coordinates in a format shown in FIG. 5. The window display coordinate storage 26 is connected to the iconifying designation detector 7, the icon display position controller 10, and the window image memory 12.

Figure 4:
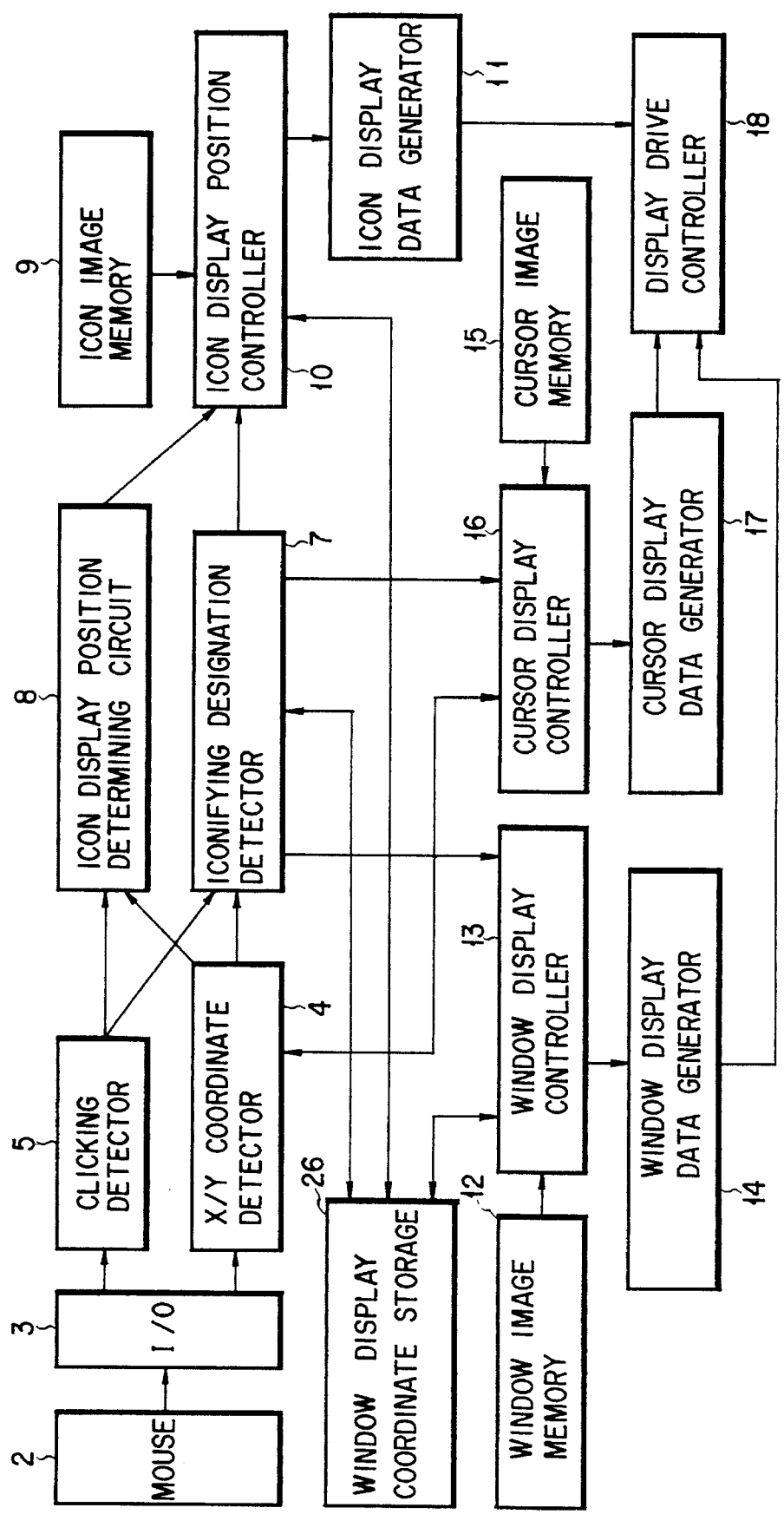
FIG. 4 is a block diagram of an icon display apparatus according to another embodiment of the present invention.

In the embodiment shown in FIG. 4, in a state wherein an initial picture is displayed, as shown in FIG. 3A, when the user operates the mouse 2 to move a pointing cursor P onto an iconifying designation mark B within a window w and depresses a click button 2A, as shown in FIG. 3B, the iconifying designation detector 7 recognizes iconifying designation in accordance with input signals from the X/Y coordinate detector 4 and the clicking detector 5. A window name and its display coordinates are read out from the window display coordinate storage 26 in a display order. When the display coordinates of the window are given as "(X1,Y2)–(X2,Y2)", and the clicking coordinates (X, Y) fall within the range of [(X1+X-coordinate offset of mark B, Y2+Y-coordinate offset of mark B)—(X1+X-coordinate offset of mark B+width of mark B, Y2+ Y-coordinate offset of mark B+height of mark B)], the corresponding window name and the corresponding iconifying designation instruction are supplied to the icon display position controller 10 and the window display controller 13.

When the iconifying display position controller 10 receives the icon display position coordinates (X,Y) from the icon display position determining circuit 8, the iconifying display position controller 10 reads out bit map data corresponding to the window name from the icon image memory 9 and sends this bit map data together with the display coordinates to the icon display data generator 11. At this time, the iconifying display position controller 10 stores icon display coordinates [(X,Y)–(X+width, Y+height)] at the icon display coordinate item of a window name entry subjected to iconifying in the window display coordinate storage 26.

Note that the icon image memory 9 stores icon data, the number of which corresponds to the number of window names in the form of [name of window+{width, height, bit map data}].

When the icon display position controller 11 receives the icon display coordinates (X,Y) and icon bit map data, it develops the bit map data into pixel values in an icon display area starting from the icon display coordinates on the bit map display, and supplies the pixel values to the display drive controller 18.

Meanwhile, when the iconifying designation detector 7 receives the window name as an iconifying target from the window display coordinate storage 26, this window name is sent to the window display controller 13. When the window display controller 13 receives this iconifying window name, the controller 13 erases the window picture corresponding to this window name from the screen. In this case, when the window display controller 13 receives iconifying designation and the iconifying window name from the iconifying designation detector 7, the controller 13 changes the iconifying flag of the window name stored in the window display coordinate storage 26 from "NO" to "YES", thereby erasing the display order, as shown in FIG. 5. In addition, the window display controller 13 renumbers the display order of other windows stored in the window display coordinate storage 26 (the remaining windows are reordered in an ascending order from one because the readout window entry has become empty). That is, in the display window, windows 4 and 5 having display order numbers 4 and 5 are updated to display order numbers 3 and 4. Thereafter, the window display controller 13 reads out window entries stored in the window display coordinate storage 26 in a descending display order (i.e., in an order from an entry having a larger number). Window pictures having the window names at the readout entries are read out from the window image memory 12. The readout window pictures are supplied together with the window display coordinates at the corresponding entries to the window display data generator 14. Only the windows which are not iconified are displayed on the display screen in accordance with the display order. In other words, the iconified window is erased.

The cursor display controller 16 causes the cursor display data generator 17 to change the arrow pointing cursor P to an icon frame pointing cursor Q. In this case, when the cursor display controller 16 receives the iconifying designation from the iconifying designation detector 7, bit map data of the cursor Q is loaded from the cursor image memory 15 to the cursor display controller 16. The cursor display controller 16 then supplies the mouse cursor display position coordinates from the X/Y coordinate detector 4 and the bit map data of the cursor Q to the cursor display data generator 17. The cursor display data generator 17 develops the input bit map data of the cursor Q at the mouse cursor display position as pixel values and sends the pixel values to the display drive controller 18. Therefore, the arrow cursor P is changed to the icon frame cursor Q, as shown in FIG. 3C.

When the user operates the mouse 2 to move the pointing cursor Q to a desired position, as shown in FIG. 3D, and the click button 2A is depressed, the icon display position determining circuit 8 determines that this cursor position is a position at which the icon is to be displayed. The icon display position determining circuit 8 sends information of this icon display position to the icon display position controller 10.

The icon display position controller 10 reads out, from the icon image memory 9, bit map data associated with the icon corresponding to the window W designated for iconifying, and sends the readout bit map data to the display data generator 11 and at the same time, sends information of this icon display position to the icon display data generator 11.

The icon display data generator 11 generates icon display data on the basis of these pieces of input information and outputs the icon display data to the CRT display 1 through the display drive controller 18. Therefore, an icon AW corresponding to the erased window W is displayed at the desired position on the screen, as shown in FIG. 3E.

Subsequently, the cursor display controller 16 controls the cursor display data generator 17 to restore the icon frame pointing cursor Q to the arrow pointing cursor P. In this case, when the cursor display controller 16 receives the icon display position coordinates from the icon display position determining circuit 8, the cursor display controller 16 loads the bit map data of the cursor P from the cursor image memory 15 and sends the mouse cursor display position coordinates received from the X/Y coordinate detector 4 and the bit map data of the cursor P to the cursor display data generator 17. The cursor display data generator 17 develops the bit map data of the cursor P at the mouse cursor display position as pixel values and sends them to the display drive controller 18. Therefore, the icon frame cursor Q is restored to the arrow cursor P.

An operation for restoring an iconified window to an original window will be described below.

When the iconifying designation detector 7 receives X/Y coordinate data from the X/Y coordinate detector 4 and click data from the clicking detector 5, the icon display coordinate entries of the window display coordinate storage 26 are read-accessed to determine whether clicking occurs within the icon display coordinate area. If clicking occurs on the icon, the window name and window restoration designation of the coordinate area corresponding to clicking are supplied to the icon display position controller 10 and the window display controller 13. The window display controller 13 changes the iconifying flag of the corresponding window name stored in the window display coordinate storage 26 from the iconifying designation detector 7 from "YES" to "NO". At the same time, the window display controller 13 updates the display order of this window to 1. In addition, the display order numbers of the entries of other windows stored in the window display coordinate storage 26 are renumbered (i.e., the display order numbers of all the remaining windows are incremented by one each). The entries of the windows stored in the window display coordinate storage 26 are sequentially read out in a descending display order, and window pictures having the window names at these entries are read out from the window image memory 12. The readout data together with the display coordinates of the windows at these entries are supplied to the window display data generator 14.

On the other hand, when the icon display position controller 10 receives the window restoration designation and the window name from the iconifying designation detector 7, the controller 10 reads out, from the window display coordinate storage 26, icon display coordinates of the entry of the designated window name. The icon display controller 10 sends the display coordinates and clear designation to the icon display data generator 11, and at the same time clears the item of the icon display coordinates of the window name entry which are stored in the window display coordinate storage 26. When the icon display data generator 11 receives the display coordinates (X,Y) of the icon to be erased and the clear designation, the generator 11 sets pixel values present in the icon display area starting from the icon display coordinates on the bit map display to zero (non-display) and sends the pixel values of the icon display area to the display drive controller 18.

By the above series of operations, the icon AW corresponding to the window W is erased, and the window W corresponding to this icon AW is displayed on the first layer (closest to the operator) of the display screen, as shown in FIG. 3A. That is, the icon AW is restored to the original window W.

The operation for changing the display position of the icon will be described below.

In order to realize movement of the icon, the iconifying designation detector 7 must have a function of moving the icon, and its control and a data flow will be described below.

The iconifying designation detector 7 detects click coordinates (X,Y) from the inputs from the X/Y coordinate detector 4 and the clicking detector 5 to determine whether these inputs represent iconifying designation of the window as follows.

The window name and the display coordinates which are stored in the window display coordinate storage are read out in a display order (i.e., in an order from the layer on the operator side). Assume that the display coordinates of the window are defined as [(X1,Y1)–(X2,Y2)]. If the click coordinates (X,Y) fall within the range of [(X1+X-coordinate offset of mark B, Y1+Y-coordinate offset of mark B)—(X1+X-coordinate offset of mark B+width of mark B, Y1+Y-coordinate offset of mark B+height of mark B)], the iconifying designation detector 7 determines that designation by the iconifying designation mark B is present, and sends the corresponding window name and the corresponding iconifying designation instruction to the icon display position controller 10 and the window display controller 13.

As a result of the series of processing operations described above, when the input click coordinates (X,Y) do not fall within the range of the display coordinates of the iconifying designation mark B of the specific window, the iconifying designation detector 7 determines 10 whether the above inputs represent an icon movement command as follows.

The window names, the iconifying flags, and the icon display coordinates are read out from the window display coordinate storage 6. Assume that the icon display coordinates of a window whose iconifying flag is set YES are defined as [(X1,Y1)–(X2,Y2)]. If the click coordinates (X,Y) satisfy conditions X1≦X≦X2 and Y1≦Y≦Y2, i.e., if the click coordinates fall within the display range of the icon, the iconifying designation detector 7 determines that the icon movement command is input and sends the corresponding window name and this icon movement instruction to the icon display position controller 10 and the cursor display controller 16.

The icon movement control and its data flow will be described below.

The icon display position controller 10 erases an icon subjected to a movement target (i.e., pixel values within the display range are cleared to zero). The cursor display controller 16 changes the shape of the pointing cursor from the arrow to the icon frame. When the click coordinates (X,Y) are input from the outputs from the X/Y coordinate detector 4 and the clicking detector 5 to the icon display position determining circuit 8, the icon display position determining circuit 8 determines that the input click coordinates (X,Y) are the display coordinates of the moved icon and sends the display coordinates of the movement destination of the icon to the icon display position controller 10. At the same time, the icon display position determining circuit 8 informs the cursor display controller 16 of the end of icon movement. The icon display position controller 10 defines the display coordinates (X,Y) sent from the icon display position determining circuit 8 as the icon display coordinates of the window serving as the movement target and stores [(X,Y)–(X+width of icon, Y+height of icon)] in the window display coordinate storage 26. At the same time, the icon display position controller 10 displays the icon at the display coordinates (X,Y) serving as the movement destination of the icon (i.e., data in the icon memory corresponding to the window subjected to icon movement is loaded and supplied together with the display coordinates to the icon display data generator 11). Meanwhile, the cursor display controller 16 changes the shape of the pointing cursor from the icon frame to the arrow.

As described above, the iconifying designation detector 7 has the two functions of detecting iconifying designation of the window and detecting the icon movement command. Icon movement can be achieved without modifying the circuit arrangement.

As has been described above, according to the present invention, when an icon display position is designated on a display screen, an icon can be displayed at a position desired by a user.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

what is claimed is:

1. An icon display apparatus comprising:

display means for displaying a picture including a window having an iconifying designation mark, a plurality of icons, and a cursor having a shape;

input means for moving the cursor to the iconifying designation mark and designating the iconifying designation mark;

iconifying designation detecting means for detecting the iconifying designation in response to the designation of the iconifying designation mark;

window display coordinate storing means for storing a window name and display coordinates of the window, a display order, an iconifying flag representing whether an iconifying state is set, and icon display coordinates;

means for reading out the window name and display coordinates thereof in a display order from said window display coordinate storing means in response to the direction of iconifying designation by said iconifying designation detecting means;

an icon image memory for storing a plurality of icon data corresponding to the plurality of icons and outputting icon data corresponding to the window name read out from said window display coordinate storing means;

window erasing means for setting the iconifying flag and erasing the display order stored in said window display coordinate storing means upon the detection of the iconifying designation from said iconifying designation detecting means;

cursor changing means for changing the shape of the cursor from a first shape to an icon frame shape which is different from an icon shape in response to the iconifying designation from said iconifying designation means and for restoring the shape of the cursor from the icon frame shape to the first shape at a location selected by user; and means for supplying the icon data corresponding to the window name, the icon data being read out from said icon image memory, and the icon display coordinates to said display means.

2. An apparatus according to claim 1, wherein said cursor changing means comprises a cursor image memory for storing cursor picture data corresponding to a plurality of cursors and means for reading out cursor picture data corresponding to said icon frame shape from said cursor image memory in response to the iconifying designation from said iconifying designation detecting means.

3. An apparatus according to claim 1, wherein said input means comprises a mouse for outputting coordinate data and click data, and said iconifying designation detecting means detects the iconifying designation upon reception of the click data from said mouse and coordinate data corresponding to the iconifying designation mark.

4. An icon display apparatus having display means for displaying a cursor having a shape, a window having an iconifying designation mark, the iconifying designation mark having a specified location in connection with the window, the icon display apparatus comprising:

an input device for entering position information and first and second selection indication information;

cursor means, responsive to the input device, for movably displaying the cursor on the display means in accordance with the position information;

iconifying designation detecting means, responsive to the position information and the first selection indication information, for detecting that the position information coincides with the specified location of the iconifying designation mark and that the first selection indication information has been entered, thereby generating an iconifying signal;

converting means, responsive to the iconifying signal, for converting the shape of the cursor from a first shape to a second shape representative of the window and erasing the window from said display means;

icon generation means, responsive to the second selection indication information, for generating an icon corresponding to the erased window at a desired position anywhere on a display screen of said display means, said desired position being determined by the cursor moved in accordance with the position information; and cursor shape restoration means, responsive to the second selection indication information, for restoring the shape of the cursor to the first shape.

5. An apparatus according to claim 4, wherein said iconifying means includes means for converting a shape of the cursor which designates the iconifying mark into a shape of an icon frame.

6. An icon display apparatus comprising:

display means having a screen with a rectangular display space corresponding to all available display areas on said screen for displaying an unconverted menu display window and a plurality of icons;

an icon image memory for storing a plurality of icon data respectively corresponding to said plurality of icons displayed in said rectangular display space;

a window image memory for storing window picture data corresponding to said unconverted menu display window displayed in said rectangular display space;

iconifying means for converting said unconverted menu display window displayed in said rectangular display space into an icon corresponding to said unconverted menu display window;

input means for designating said unconverted menu display window to be iconified and for movably designating a display position of said icon corresponding to said unconverted menu display window anywhere in said rectangular display space, said movable designation of said icon display position being automatically activated in response to said conversion of said unconverted menu display window; and display driving means for supplying icon data corresponding to said unconverted menu display window and coordinate data corresponding to said designated display position, to display said icon corresponding to said unconverted menu display window at said designated display position anywhere in said rectangular display space, so that said icon corresponding to said unconverted menu display window may be freely positioned in accordance with said movably designated display position instead of being located in a predetermined area in said rectangular display space, wherein said unconverted menu display window displayed in said rectangular display space has an iconifying mark, said input means comprises means for movably displaying a cursor in said rectangular display area, and said iconifying means comprises iconifying designation detecting means for detecting designation of said iconifying mark in accordance with said cursor moved by said input means and means for, in response to detection of iconifying designation by said iconifying designation detecting means, reading out, from said icon image memory, icon data corresponding to said unconverted menu display window designated by said input means, wherein said iconifying means includes means for converting a shape of said cursor which designates said iconifying mark into a shape of an icon frame.

7. Icon display apparatus comprising:

display means for generating a display of a window and a movable cursor;

a clicking detector for detecting that an input device button has been depressed and generating in response thereto a clicking signal;

a designation mark coordinate determining circuit for determining that a designation mark associated with said window has been designated on said display and generating in response thereto an output signal;

an iconifying designation detector, coupled to said clicking detector and to said designation mark coordinate determining circuit, for generating a conversion signal in response to detecting a first clicking signal corresponding to a first depression of said input device button from said clicking detector coincidentally with said output signal;

a window display controller, coupled to said iconifying designation detector, for erasing said window from said display in response to said conversion signal;

means, coupled to said iconifying designation detector and to said clicking detector, for changing said cursor into an icon frame in response to said conversion signal and allowing said icon frame to be immediately moved to a new position anywhere on said display without an additional clicking signal from said clicking detector, and responsive to a second clicking signal from said clicking detector corresponding to a second depression of said input device button, changing said icon frame back into said cursor at said new position on said display; and means, responsive to said second clicking signal from said clicking detector corresponding to said second depression, for generating an icon corresponding to said erased window at said new position on said display.

* * * * *